(12) United States Patent
Takayanagi et al.

(10) Patent No.: US 10,501,036 B2
(45) Date of Patent: Dec. 10, 2019

(54) BUMPER REINFORCEMENT

(71) Applicants: TOYOTA JIDOSHA KABUSHIKI KAISHA, Toyota-shi, Aichi-ken (JP); TOYOTA SHATAI KABUSHIKI KAISHA, Kariya-shi, Aichi (JP)

(72) Inventors: Junichi Takayanagi, Nagoya (JP); Toshihisa Miura, Toyoake (JP)

(73) Assignees: TOYOTA JIDOSHA KABUSHIKI KAISHA, Toyota (JP); TOYOTA SHATAI KABUSHIKI KAISHA, Kariya (JP)

( * ) Notice: Subject to any disclaimer, the term of this patent is extended or adjusted under 35 U.S.C. 154(b) by 0 days.

(21) Appl. No.: 16/048,707

(22) Filed: Jul. 30, 2018

(65) Prior Publication Data

US 2019/0084512 A1   Mar. 21, 2019

(30) Foreign Application Priority Data

Sep. 15, 2017   (JP) .................................. 2017-177503

(51) Int. Cl.
*B60R 19/03*  (2006.01)
*B60R 19/22*  (2006.01)
*B60R 19/18*  (2006.01)
*B60K 5/04*   (2006.01)

(52) U.S. Cl.
CPC .............. *B60R 19/22* (2013.01); *B60R 19/03* (2013.01); *B60K 5/04* (2013.01); *B60R 2019/1813* (2013.01)

(58) Field of Classification Search
CPC .......... B60R 19/02; B60R 19/03; B60R 19/22

USPC ................................................... 293/102, 120
See application file for complete search history.

(56) References Cited

U.S. PATENT DOCUMENTS

| | | | | |
|---|---|---|---|---|
| 7,077,438 B2* | 7/2006 | Albers | ................... | B60J 5/0447 293/102 |
| 2004/0174024 A1* | 9/2004 | Murata | ................... | B60R 19/18 293/109 |
| 2012/0104775 A1* | 5/2012 | Marur | ..................... | B60R 19/18 293/120 |
| 2014/0124315 A1* | 5/2014 | Okuda | .................... | F16F 7/121 188/376 |
| 2014/0305757 A1* | 10/2014 | Okuda | .................... | B60R 19/03 188/371 |

(Continued)

FOREIGN PATENT DOCUMENTS

| | | |
|---|---|---|
| JP | 2014-184899 A | 10/2014 |
| JP | 2017-013722 A | 1/2017 |

*Primary Examiner* — Gregory A Blankenship
(74) *Attorney, Agent, or Firm* — Oliff PLC

(57) ABSTRACT

The present disclosure provides a bumper reinforcement including: a bumper main body portion extending in a vehicle transverse direction and is provided at a vehicle longitudinal direction outer side of a pair of left and right side members, the pair of left and right side members being disposed at a vehicle front portion or a vehicle rear portion and extending in a vehicle longitudinal direction; and a reinforcing member formed of wood and is block-shaped, and that is disposed within a cross-section of at least a vehicle transverse direction central portion of the bumper main body portion, an axially central direction of annual growth rings of the wood of the reinforcing member being set to a direction that runs along the vehicle transverse direction.

7 Claims, 12 Drawing Sheets

(56) References Cited

U.S. PATENT DOCUMENTS

| | | | |
|---|---|---|---|
| 2014/0346789 A1* | 11/2014 | Okuda | F16F 7/12 |
| | | | 293/122 |
| 2016/0264082 A1* | 9/2016 | Berger | B60R 19/03 |
| 2019/0084512 A1* | 3/2019 | Takayanagi | B60R 19/22 |
| 2019/0143919 A1* | 5/2019 | Miura | B60R 19/22 |
| | | | 293/120 |

* cited by examiner

BUMPER REINFORCEMENT

CROSS-REFERENCE TO RELATED APPLICATION

This application is based on and claims priority under 35 USC 119 from Japanese Patent Application No. 2017-177503 filed on Sep. 15, 2017, the disclosure of which is incorporated by reference herein.

BACKGROUND

Technical Field

The present disclosure relates to a bumper reinforcement.

Related Art

Japanese Patent Application Laid-Open (JP-A) No. 2017-13722 discloses a structure in which plural partitioning members, which are plate-shaped and are made of steel, are provided within the cross-section of a bumper reinforcement. Further, JP-A No. 2014-184899 discloses a structure in which impact absorbing members that are made of wood are provided at portions of crash boxes that are between a bumper reinforcement and side members. In this JP-A No. 2014-184899, the impact absorbing members are crushed easily in the axial direction by making the axially central directions of the annual growth rings of the impact absorbing members coincide with the axial directions of the crash boxes (the vehicle longitudinal direction).

In the bumper reinforcement disclosed in JP-A No. 2017-13722, sectional collapse of the bumper reinforcement is suppressed by the partitioning members. However, in a case of colliding with a collision body that is relatively small such as a pole or the like, due to collision load being applied locally to the bumper reinforcement, there is the possibility that the bumper reinforcement will break locally and will penetrate in toward the cabin side. On the other hand, if the plate thickness of the bumper reinforcement itself is made to be thick or the plate thickness of the partitioning members is made to be thick, local breakage of the bumper reinforcement can be suppressed, but, on the other hand, the weight increases.

SUMMARY

The present disclosure provides a bumper reinforcement that may suppress local breakage while suppressing an increase in weight.

A first aspect of the present disclosure is a bumper reinforcement including: a bumper main body portion extending in a vehicle transverse direction and is provided at a vehicle longitudinal direction outer side of a pair of left and right side members, the pair of left and right side members being disposed at a vehicle front portion or a vehicle rear portion and extending in a vehicle longitudinal direction; and a reinforcing member formed of wood and is block-shaped, and that is disposed within a cross-section of at least a vehicle transverse direction central portion of the bumper main body portion, an axially central direction of annual growth rings of the wood of the reinforcing member being set to a direction that runs along the vehicle transverse direction.

In the bumper reinforcement of the first aspect, the bumper main body portion extends in the vehicle transverse direction. The bumper main body portion is provided at the vehicle longitudinal direction outer side of a pair of left and right side members that are disposed at the vehicle front portion or the vehicle rear portion and that extend in the vehicle longitudinal direction. Further, the reinforcing member is disposed within the cross-section of at least the vehicle transverse direction central portion of the bumper main body portion. The reinforcing member is formed of wood and is block-shaped. Here, the axially central direction of the annual growth rings of the reinforcing member is a direction that runs along the vehicle transverse direction. Due thereto, load is dispersed along the axially central direction of the annual growth rings. Therefore, even in a case in which a collision body that is relatively small, such as a pole, collides with the vehicle transverse direction central portion of the bumper reinforcement, the collision load may be dispersed in the vehicle transverse direction, and local breakage of the bumper reinforcement may be suppressed.

Further, due to the reinforcing member being formed of wood, an increase in weight may be suppressed as compared with a case in which the plate thickness of the bumper main body portion is made to be thick, or the like. Note that what is called vehicle longitudinal direction outer side of the side members here means the vehicle front side of side members that are disposed at the vehicle front portion, or the vehicle rear side of side members that are disposed at the vehicle rear portion. Further, "the axially central direction of the annual growth rings" means the direction running along the central axis of the annual growth rings of the wood in a state before cutting.

In a second aspect of the present disclosure, in the above first aspect, a power unit, at which an engine and a transaxle are connected in the vehicle transverse direction, is disposed at a vehicle longitudinal direction inner side of the vehicle transverse direction central portion of the bumper main body portion; and the reinforcing member is disposed at a vehicle longitudinal direction outer side of at least a connected portion of the engine and the transaxle.

In the bumper reinforcement of the second aspect, the reinforcing member is disposed at the vehicle longitudinal direction outer side of the connected portion of the engine and the transaxle. Due thereto, even in a case in which a collision body collides with the bumper reinforcement, local breakage of the bumper reinforcement at the connected portion of the engine and the transaxle may be suppressed.

In a third aspect of the present disclosure, in the above first and second aspects, both end portions in the vehicle transverse direction of the reinforcing member are positioned further toward vehicle transverse direction outer sides than distal end portions of the side members.

In the bumper reinforcement of the third aspect, load that is inputted from a collision body to the bumper reinforcement may be dispersed in the vehicle transverse direction and may be transmitted to the side members. Note that what is called "distal end portions of the side members" here means the front end portions of side members that are disposed at the vehicle front portion, or the rear end portions of side members that are disposed at the vehicle rear portion.

In a fourth aspect of the present disclosure, in the above third aspect, the reinforcing member includes a pair of left and right breakage starting point portions that are provided further toward a vehicle transverse direction inner side than the distal end portions of the side members.

In the bumper reinforcement of the present disclosure, in a case in which a collision body collides with the vehicle transverse direction central portion of the bumper reinforcement, the reinforcing member breaks with the pair of left and right breakage starting point portions being the starting points. Due thereto, the bumper reinforcement breaks at two places that are further toward the vehicle transverse direction inner side than the distal end portions of the side members. Namely, the bumper reinforcement may be broken at two points.

In a fifth aspect of the present disclosure, in the above second aspect, both end portions in the vehicle transverse direction of the reinforcing member are positioned further toward a vehicle transverse direction inner side than distal end portions of the side members and further toward vehicle transverse direction outer sides than the power unit.

In the bumper reinforcement of the fifth aspect, in a case in which a collision body collides with the bumper reinforcement, two-point breakage is brought about with the vehicle transverse direction both end portions of the reinforcing member being the starting points. Here, because the vehicle transverse direction both end portions of the reinforcing member are positioned further toward the vehicle transverse direction inner side than the distal end portions of the side members, the bumper reinforcement may be broken at two points at further toward the vehicle transverse direction inner side than these distal end portions. Further, the vehicle transverse direction both end portions of the reinforcing member are positioned further toward the vehicle transverse direction outer sides than the power unit. Therefore, even in a case in which the reinforcing member that has broken at two points moves toward the power unit side, collision load being applied locally to the power unit may be suppressed.

In a sixth aspect of the present disclosure, in the first above aspect, further comprising side reinforcing members provided at both end portions in the vehicle transverse direction of the reinforcing member, which are positioned at vehicle longitudinal direction outer sides of distal end portions of the side members, the side reinforcing members being formed of wood and being block-shaped, an axially central direction of annual growth rings of the wood of the side reinforcing members being set to a direction that runs along the vehicle longitudinal direction.

In the bumper reinforcement of the sixth aspect, by making the axially central direction of the annual growth rings of the side reinforcing members be a direction that runs along the vehicle longitudinal direction, in a case in which collision load is inputted, the side reinforcing members may be crushed in the vehicle longitudinal direction and may absorb collision energy.

In a seventh aspect of the present disclosure, in the above sixth aspect, gaps are provided between the side reinforcing members and the reinforcing member.

In the bumper reinforcement of the seventh aspect, in a case in which a collision body collides with the bumper reinforcement, two-point breakage of the bumper reinforcement may be brought about with the gaps between the reinforcing member and the side reinforcing members being the starting points.

The bumper reinforcement of the first aspect may suppress local breakage while suppressing an increase in weight.

The bumper reinforcement of the second aspect may suppress the engine or the transaxle from interfering with vehicle frame members due to the engine and the transaxle, which are in a connected state, being disconnected.

The bumper reinforcement of the third aspect may effectively transmit the collision load in the vehicle longitudinal direction via the side members.

The bumper reinforcement relating to the fourth aspect may suppress local breakage of the bumper reinforcement at the vehicle transverse direction central portion thereof.

The bumper reinforcement of the fifth aspect may suppress disconnection of the engine and the transaxle, which are in a connected state.

The bumper reinforcement of the sixth aspect may effectively absorb the collision energy.

The bumper reinforcement of the seventh aspect may suppress local breakage of the bumper reinforcement at the vehicle transverse direction central portion thereof, and may effectively absorb the collision energy.

BRIEF DESCRIPTION OF THE DRAWINGS

Exemplary embodiments of the present disclosure will be described in detail based on the following figures, wherein.

DETAILED DESCRIPTION

First Exemplary Embodiment

A bumper reinforcement 10 relating to a first exemplary embodiment is described with reference to the drawings. Note that arrow FR, arrow UP and arrow RH that are marked appropriately in the respective drawings indicate the forward direction of the vehicle, the upward direction, and the vehicle right side, respectively. Hereinafter, when explanation is given by merely using longitudinal, vertical and left-right directions, they refer to the longitudinal of the vehicle longitudinal direction, the vertical of the vehicle vertical direction, and the left and the right in the vehicle transverse direction when facing in the advancing direction, unless otherwise indicated.

Figure 1:
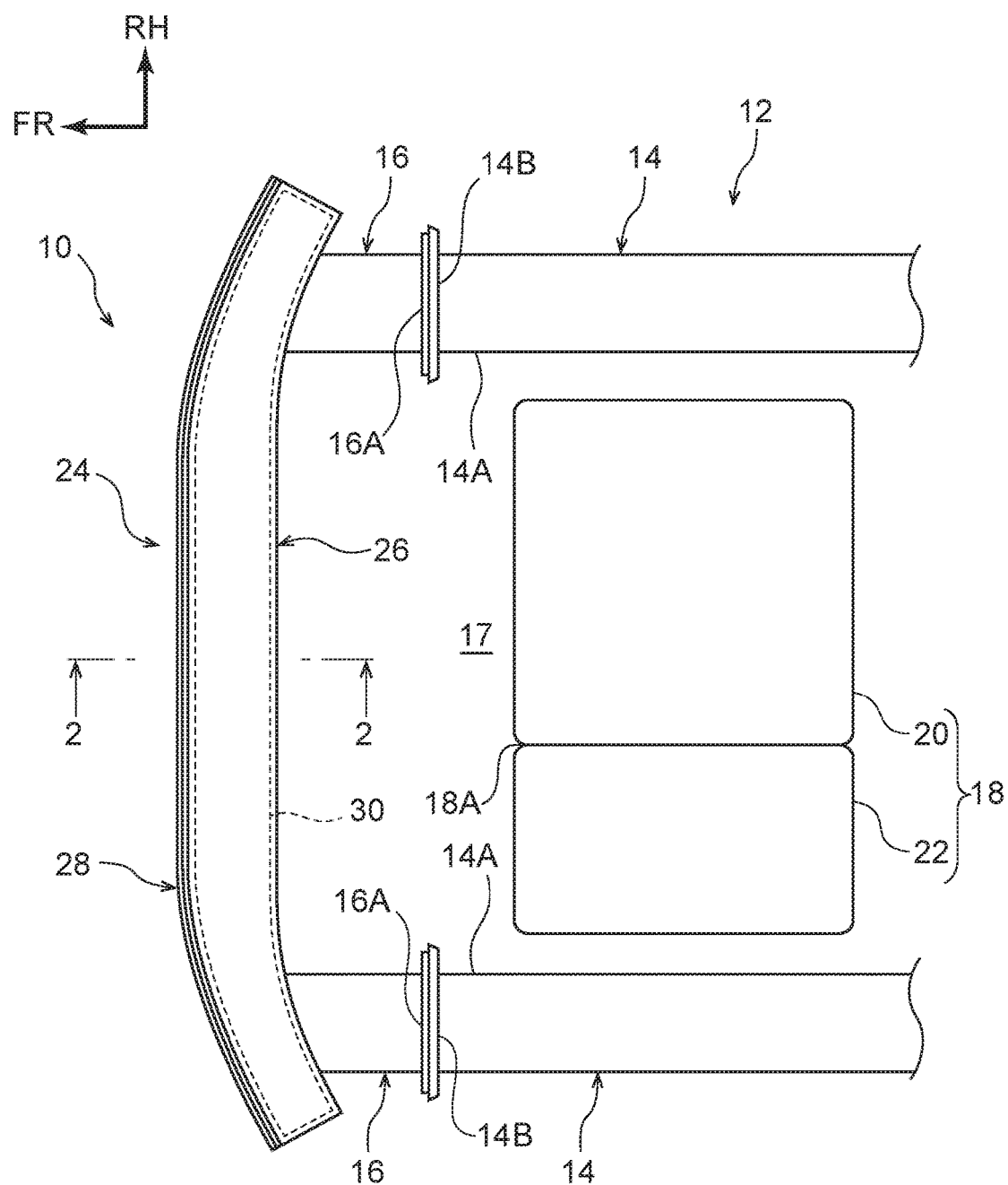
FIG. 1 is a schematic plan view that schematically shows the front portion of a vehicle to which a bumper reinforcement relating to a first exemplary embodiment is mounted.

As shown in FIG. 1, the bumper reinforcement 10 relating to the present exemplary embodiment is applied to the vehicle front portion of a vehicle 12. A pair of left and right front side members 14 that extend in the vehicle longitudinal direction are provided at the vehicle front portion of the vehicle 12.

The pair of left and right front side members 14 are vehicle frame members that are closed cross-sectional structures and whose axial directions are the vehicle longitudinal direction. Front flanges 14B extend toward the outer peripheral side from front end portions 14A of the respective front side members 14. Further, crash boxes 16 are provided at the vehicle front sides of the front side members 14.

The crash boxes 16 are tubular members that are hollow and whose axial directions are the vehicle longitudinal direction. Rear flanges 16A extend-out toward the outer peripheral side from the rear end portions of the crash boxes 16. The rear flanges 16A are fastened by fastening members or the like to the front flanges 14B of the front side members 14 in state of being superposed together therewith. Unillustrated deformation starting point portions such as beads or the like are formed at the crash boxes 16, and the crash boxes 16 are made to be shapes that are crushed in the axial direction (the vehicle longitudinal direction).

Here, a power unit chamber 17 is formed between the pair of left and right front side members 14, and a power unit 18 is disposed in the power unit chamber 17. The power unit 18 is disposed at the vehicle rear side (the vehicle longitudinal direction inner side) of the vehicle transverse direction central portion of a bumper main body portion 24 that is described later, and is structured to include an engine 20 and a transaxle 22. The power unit 18 is structured due to the engine 20 and the transaxle 22 being connected in the vehicle transverse direction. Note that, in the present exemplary embodiment, a connected portion 18A of the engine 20 and the transaxle 22 is set at a position that is offset further toward the vehicle left side than the vehicle transverse direction center, but is not limited to this.

The bumper reinforcement 10 is provided at the vehicle front side (the vehicle longitudinal direction outer side) of the front side members 14. The bumper reinforcement 10 is joined to the front side members 14 via the crash boxes 16, and extends in the vehicle transverse direction. Here, the vehicle transverse direction both end portions of the bumper reinforcement 10 are respectively curved toward the vehicle rear side while heading toward the vehicle transverse direction outer sides as seen in a plan view, and extend further toward the vehicle transverse direction outer sides than the front side members 14.

Figure 2:
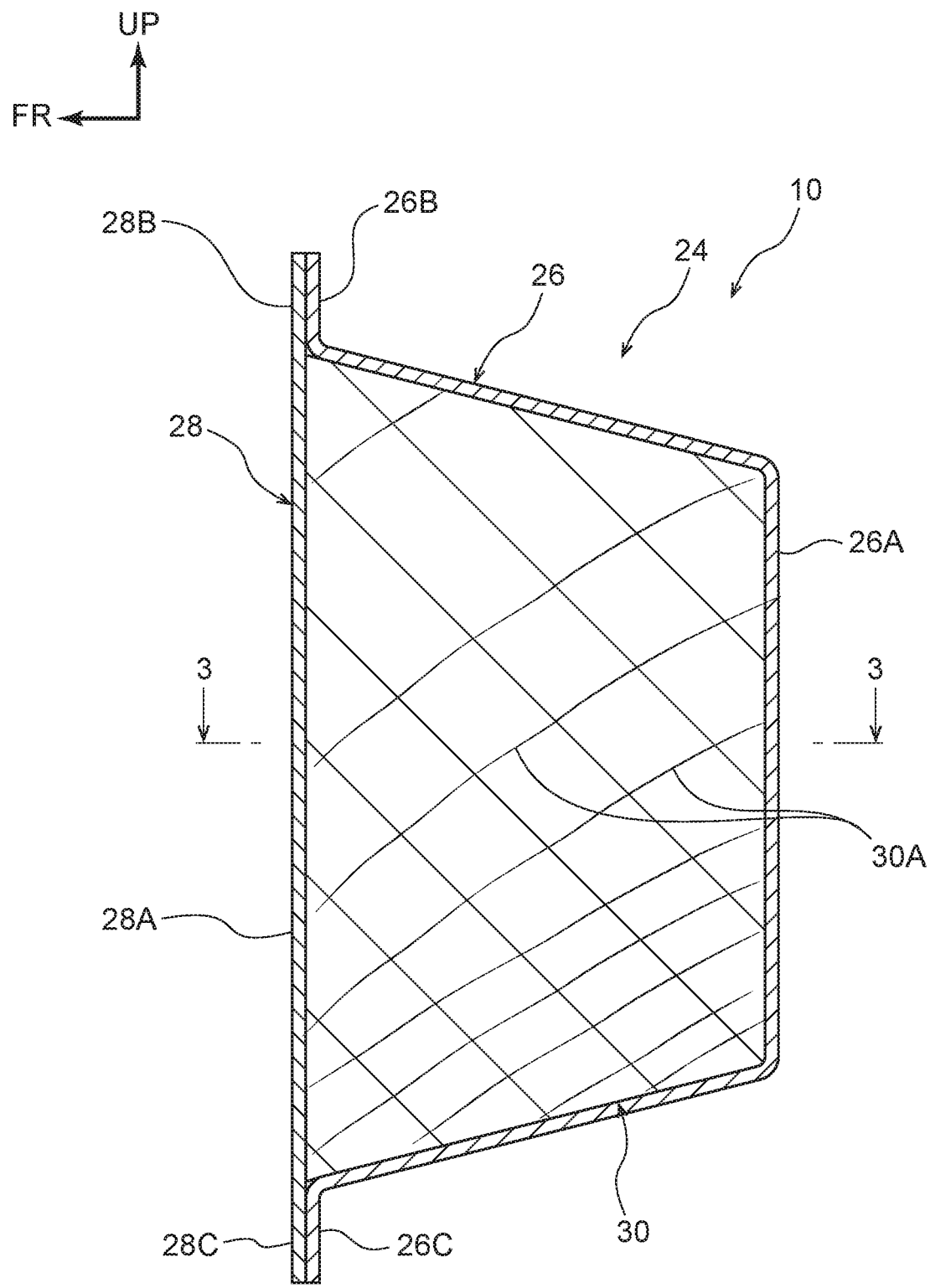
FIG. 2 is a side sectional view showing the state cut along line 2-2 of FIG. 1.

As shown in FIG. 2, the bumper reinforcement 10 is structured to include the bumper main body portion 24 that is made of metal and a reinforcing member 30. The bumper main body portion 24 is structured to include a rear side member 26 that is positioned at the vehicle rear side, and a front side member 28 that is positioned at the vehicle front side. The bumper main body portion 24 extends in the vehicle transverse direction.

The rear side member 26 has a rear side main body portion 26A that is substantially U-shaped in cross-section and opens toward the vehicle front side. Further, a rear side upper flange 26B extends-out toward the vehicle upper side from the upper end portion of the rear side main body portion 26A, and a rear side lower flange 26C extends-out toward the vehicle lower side from the lower end portion of the rear side main body portion 26A. Therefore, the rear side member 26 is formed in a substantial hat shape in cross-section that opens toward the vehicle front side.

The front side member 28 is formed in the shape of a flat plate whose thickness direction is the vehicle longitudinal direction. The front side member 28 has a front side main body portion 28A that is positioned at the vehicle vertical direction central portion and closes-off the opening of the rear side member 26. Further, a front side upper flange 28B extends-out toward the vehicle upper side from the upper end portion of the front side main body portion 28A. This front side upper flange 28B is joined by spot welding or the like to the rear side upper flange 26B of the rear side member 26 in a state of being superposed therewith. Moreover, a front side lower flange 28C extends-out toward the vehicle lower side from the lower end portion of the front side main body portion 28A. This front side lower flange 28C is joined by spot welding or the like to the rear side lower flange 26C of the rear side member 26 in a state of being superposed therewith. Due thereto, the bumper main body portion 24 of the present exemplary embodiment is a closed cross-sectional structure.

The reinforcing member 30 is provided within the cross-section of the bumper main body portion 24. As shown in FIG. 1, the reinforcing member 30 is formed of wood and is block-shaped, and, in the present exemplary embodiment, is formed of laminated wood as an example. Further, the reinforcing member 30 is disposed at the vehicle front side (the vehicle longitudinal direction outer side) of at least the connected portion 18A of the engine 20 and the transaxle 22. In the present exemplary embodiment, the reinforcing member 30 is provided over the entire region from a vehicle transverse direction one end portion to the other end portion of the bumper main body portion 24. Therefore, the vehicle transverse direction outer side end portions of the reinforcing member 30 are positioned further toward the vehicle transverse direction outer sides than the front end portions 14A (the distal end portions) of the front side members 14.

Figure 3:
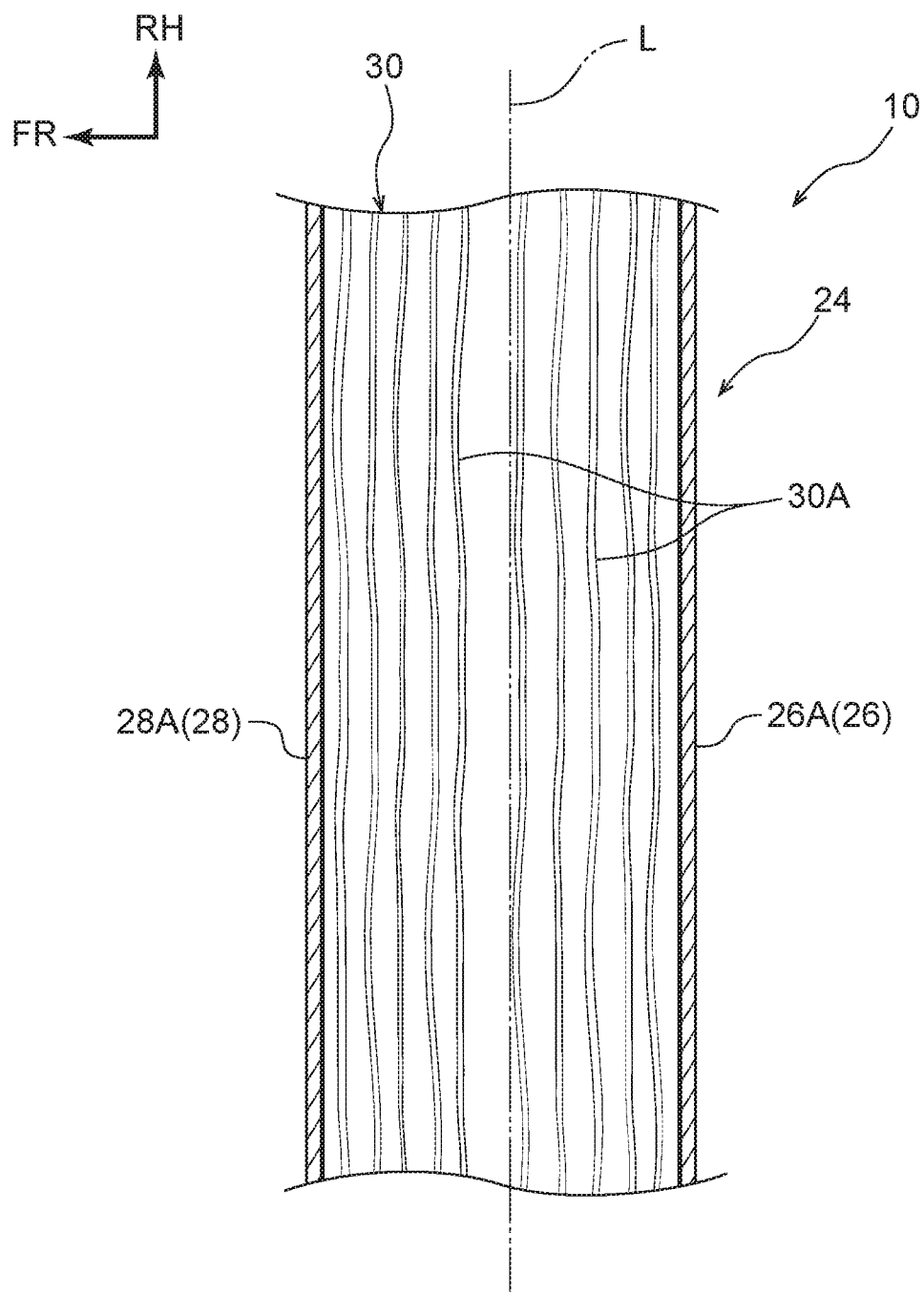
FIG. 3 is a plan sectional view showing the state cut along line 3-3 of FIG. 2.

Here, as shown in FIG. 3, axially central direction L of annual growth rings 30A of the wood that forms the reinforcing member 30 is a direction that runs along the vehicle transverse direction. Namely, as seen in a plan cross-section, the annual growth rings 30A extend along the vehicle transverse direction. Note that what is called "a direction that runs along the vehicle transverse direction" here is not limited to a structure in which the axially central direction L of the annual growth rings 30A are strictly orthogonal to the vehicle longitudinal direction, and is a concept that includes structures in which the annual growth rings 30A extend from a vehicle transverse direction one end side toward the other end side.

(Operation)

Operation of the present exemplary embodiment are described next.

In the bumper reinforcement 10 of the present exemplary embodiment, as described above, the reinforcing member 30 is disposed within the cross-section of at least the vehicle transverse direction central portion of the bumper main body portion 24. The axially central direction L of the annual growth rings 30A of the reinforcing member 30 is a direction that runs along the vehicle transverse direction. Due thereto, local breakage of the bumper reinforcement 10 may be suppressed. This operation is explained with reference to FIG. 4.

Figure 4:
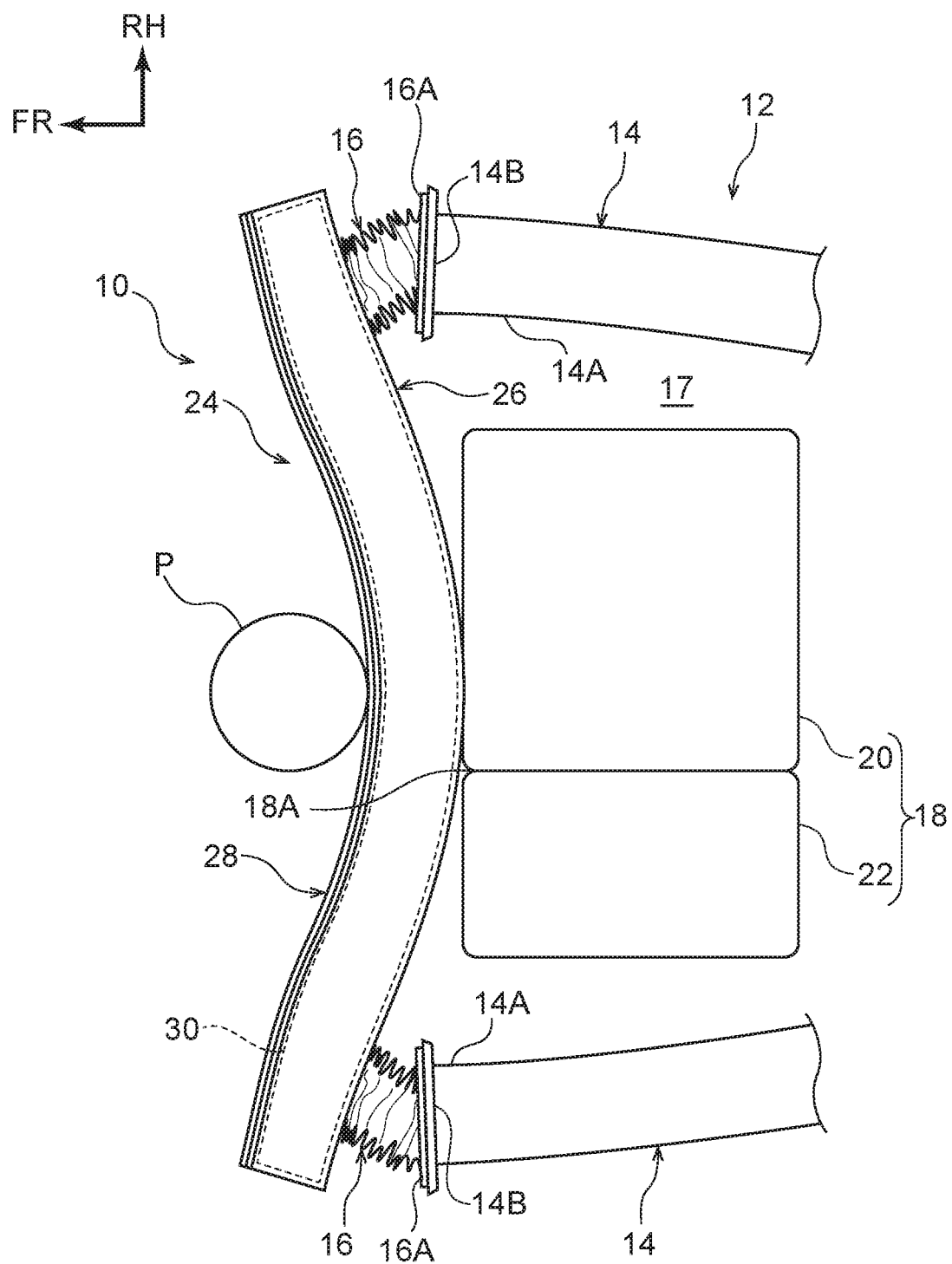
FIG. 4 is a schematic plan view that schematically shows a state in which the vehicle, to which the bumper reinforcement relating to the first exemplary embodiment is mounted, has front-collided with a pole.

As shown in FIG. 4, a case is considered in which a pole P, which serves as an example of a relatively small collision body, collides with the vehicle transverse direction central portion of the bumper reinforcement 10. At this time, collision load is inputted in the vehicle longitudinal direction from the pole P via the bumper main body portion 24 to the reinforcing member 30. Here, the axially central direction L of the annual growth rings 30A of the reinforcing member 30 is a direction that runs along the vehicle transverse direction (see FIG. 3). Therefore, the collision load is dispersed in the vehicle transverse direction that is the axially central direction L of these annual growth rings 30A. As a result, collision load concentrating only at the region where the pole P collides may be suppressed, and local breakage of the bumper reinforcement 10 may be suppressed.

Further, in the present exemplary embodiment, because the reinforcing member 30 is formed of wood and is block-shaped, an increase in the weight of the bumper reinforcement 10 overall may be suppressed as compared with a structure in which the yield strength is improved by making the plate thickness of the bumper main body portion 24 be thick, or the like. Namely, local breakage may be suppressed while suppressing an increase in the weight of the bumper reinforcement 10.

Moreover, in the present exemplary embodiment, the reinforcing member 30 is disposed at the vehicle front side of at least the connected portion 18A of the engine 20 and the transaxle 22. Due thereto, even in a case in which a collision object such as the pole P or the like collides with the bumper reinforcement 10, the bumper reinforcement 10 breaking locally at the connected portion 18A of the engine 20 and the transaxle 22 may be suppressed. As a result, the engine 20 and the transaxle 22, which are in the connected state, being disconnected, and the engine 20 or the transaxle 22 interfering with vehicle frame members, may be suppressed.

Concretely, in a structure that does not have the reinforcing member 30, in a case in which the bumper reinforcement 10 breaks locally at the above-described connected portion 18A, it is thought that the connected portion 18A will break and the engine 20 and the transaxle 22 will separate. At this time, there are cases in which the engine 20 or the transaxle 22 is displaced toward a vehicle transverse direction outer side while the orientation thereof is changed, and there is the possibility that the engine 20 or the transaxle 22 will interfere with the front side member 14. In the present exemplary embodiment, because breakage of the connected portion 18A is suppressed and the connected state is maintained good, the engine 20 or the transaxle 22 interfering with a vehicle frame member such as the front side member 14 or the like may be suppressed.

Still further, in the present exemplary embodiment, the vehicle transverse direction outer side end portions of the reinforcing member 30 are positioned further toward the vehicle transverse direction outer sides than the front end portions 14A of the front side members 14. Due thereto, the collision load that is inputted from the pole P to the bumper reinforcement 10 is dispersed in the vehicle transverse direction and can be transmitted to the front side members 14. Namely, the collision load may be transmitted effectively in the vehicle longitudinal direction via the front side members 14.

Note that, as shown in FIG. 2, the bumper reinforcement 10 of the present exemplary embodiment structures a closed cross-section by the rear side member 26 that is substantially hat-shaped in cross-section and the front side member 28 that is shaped as a flat plate. However, the bumper reinforcement is not limited to this, and may be structured such as in the modified examples shown in FIG. 5 and FIG. 6 for example.

First Modified Example

Figure 5A:
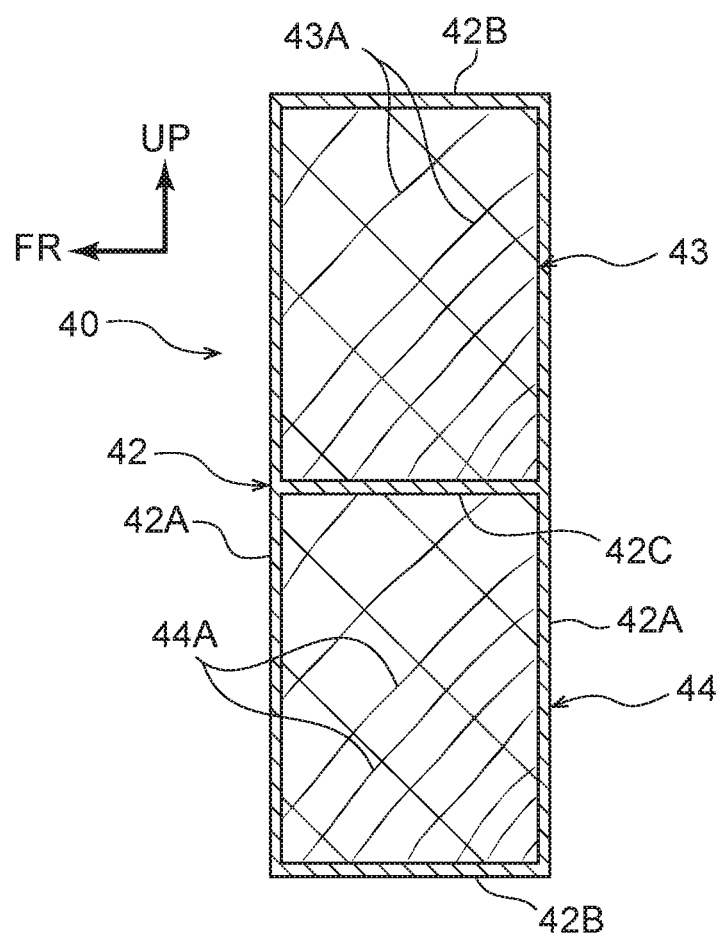
FIG. 5A is a side sectional view showing a first modified example of the first exemplary embodiment.

As shown in FIG. 5A, a bumper reinforcement 40 relating to a first modified example has a bumper main body portion 42 that is formed by extrusion molding of a metal. The bumper main body portion 42 is structured to include vertical walls 42A that are disposed with an interval therebetween the vehicle longitudinal direction, and lateral walls 42B that connect the upper end portions and the lower end portions of the vertical walls 42A together in the vehicle longitudinal direction. Further, the vehicle vertical direction central portions of the vertical walls 42A are connected in the vehicle longitudinal direction by a partitioning wall 42C. Therefore, the bumper main body portion 42 is a structure having two closed cross-sections in the vertical direction. An upper side reinforcing member 43 that is formed of wood and is block-shaped is disposed within the closed cross-section that is at the upper side, and a lower side reinforcing member 44 that is formed of wood and is block-shaped is disposed within the closed cross-section that is at the lower side.

In the same way as the reinforcing member 30 of the first exemplary embodiment, the upper side reinforcing member 43 and the lower side reinforcing member 44 respectively are provided over the entire region from a vehicle transverse direction one end portion to the other end portion of the bumper main body portion 42. Further, the axially central direction of annual growth rings 43A of the wood that forms the upper side reinforcing member 43, and the axially central direction of annual growth rings 44A of the wood that forms the lower side reinforcing member 44, are directions that run along the vehicle transverse direction.

Second Modified Example

Figure 5B:
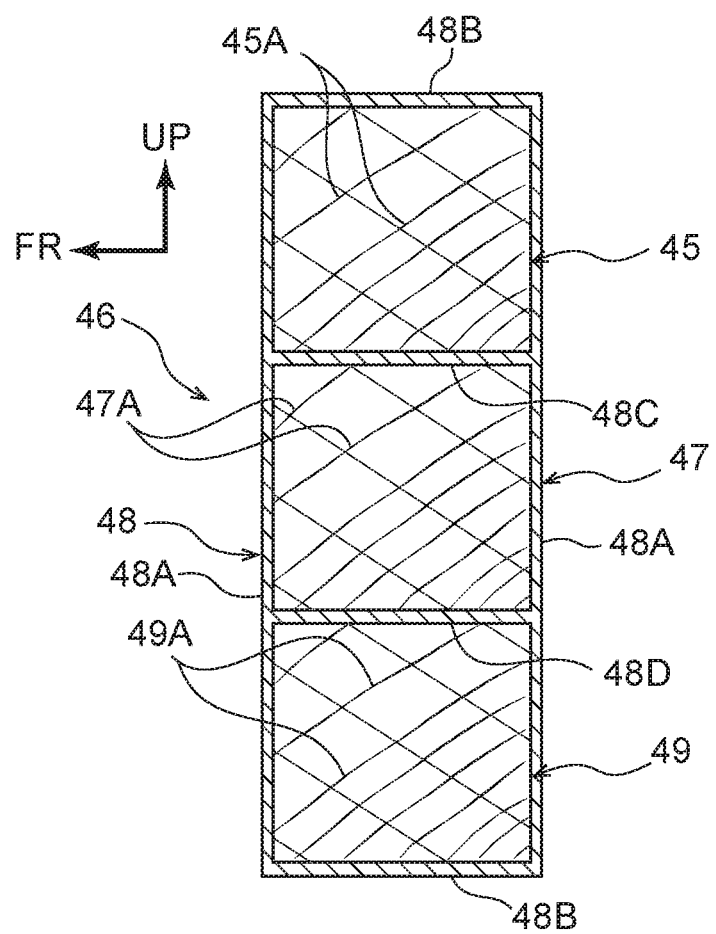
FIG. 5B is a side sectional view showing a second modified example of the first exemplary embodiment.

As shown in FIG. 5B, a bumper reinforcement 46 relating to a second modified example has a bumper main body portion 48 that is formed by extrusion molding of a metal. The bumper main body portion 48 is structured to include vertical walls 48A that are disposed with an interval therebetween the vehicle longitudinal direction, and lateral walls 48B that connect the upper end portions and the lower end portions of the vertical walls 48A together in the vehicle longitudinal direction. Further, an upper partitioning wall 48C and a lower partitioning wall 48D that connect the vertical walls 48A in the vehicle longitudinal direction are provided between the upper and lower lateral walls 48B. The closed cross-section at the interior of the bumper main body portion 48 is divided into three equal portions in the vertical direction by the upper partitioning wall 48C and the lower partitioning wall 48D. An upper side reinforcing member 45 that is formed of wood and is block-shaped is disposed within the closed cross-section that is at the upper side, and a lower side reinforcing member 49 that is formed of wood and is block-shaped is disposed within the closed cross-section that is at the lower side. A central side reinforcing member 47 that is formed of wood and is block-shaped is disposed within the closed cross-section that is between the upper partitioning wall 48C and the lower partitioning wall 48D.

In the same way as the reinforcing member 30 of the first exemplary embodiment, the upper side reinforcing member 45, the central side reinforcing member 47 and the lower side reinforcing member 49 are respectively provided over the entire region from a vehicle transverse direction one end portion to the other end portion of the bumper main body portion 48. Further, the axially central direction of annual growth rings 45A of the wood that forms the upper side reinforcing member 45, the axially central direction of annual growth rings 47A of the wood that forms the central side reinforcing member 47, and the axially central direction of annual growth rings 49A of the wood that forms the lower side reinforcing member 49 are directions that run along the vehicle transverse direction.

Third Modified Example

Figure 6:
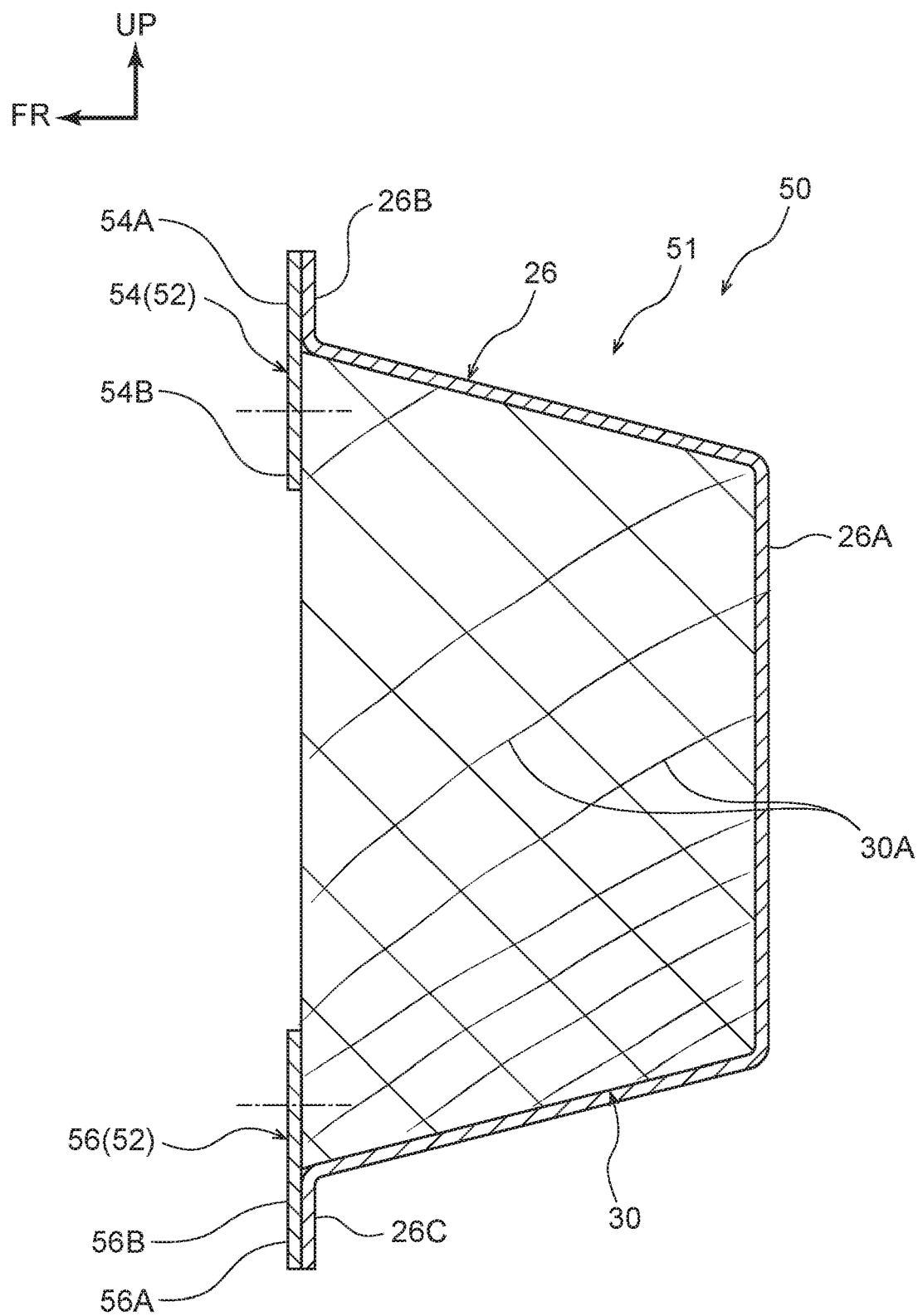
FIG. 6 is a side sectional view that corresponds to FIG. 2 and shows a third modified example of the first exemplary embodiment.

As shown in FIG. 6, a bumper reinforcement 50 relating to a third modified example has a bumper main body portion 51 that is structured to include the rear side member 26 that is positioned at the vehicle rear side, and a front side member 52 that is positioned at the vehicle front side.

The rear side member 26 is a structure that is similar to that of the first exemplary embodiment. The front side member 52 is structured to include a front side upper member 54 and a front side lower member 56. The front side upper member 54 is formed in the shape of a flat plate whose thickness direction is the vehicle longitudinal direction, and is positioned at the upper end portion of the bumper main body portion 51. The vehicle upper side of the front side upper member 54 is a front side upper flange 54A, and this front side upper flange 54A is joined by spot welding or the like to the rear side upper flange 26B of the rear side member 26 in a state of being superposed therewith. An upper side supporting portion 54B extends-out toward the vehicle lower side from the front side upper flange 54A, and the front surface of the upper end portion of the reinforcing member 30 is supported by this upper side supporting portion 54B.

On the other hand, the front side lower member 56 is formed in the shape of a flat plate whose thickness direction is the vehicle longitudinal direction, and is positioned at the lower end portion of the bumper main body portion 51. The vehicle lower side of the front side lower member 56 is a front side lower flange 56A, and this front side lower flange 56A is joined by spot welding or the like to the rear side lower flange 26C of the rear side member 26 in a state of being superposed therewith. A lower side supporting portion 56B extends-out toward the vehicle upper side from the front side lower flange 56A, and the front surface of the lower end portion of the reinforcing member 30 is supporting by this lower side supporting portion 56B.

Here, because the front side upper member 54 and the front side lower member 56 are disposed with an interval therebetween the vehicle vertical direction, the opening of the rear side member 26 is not closed-off. Namely, the bumper reinforcement 50 relating to the present modified example is an open cross-sectional structure. Note that the reinforcing member 30 can be mounted to the bumper main body portion 51 by bolts or the like being driven-in from the vehicle front sides of the front side upper member 54 and the front side lower member 56.

The bumper reinforcement 40 of the first modified example, the bumper reinforcement 46 of the second modified example, and the bumper reinforcement 50 of the third modified example that are described above operates in a similar manner to those of the bumper reinforcement 10 of the above-described first exemplary embodiment.

Second Exemplary Embodiment

A bumper reinforcement 60 relating to a second exemplary embodiment is described next with reference to the drawings. Note that structures that are similar to those of the first exemplary embodiment are denoted by the same reference numerals, and description thereof is omitted as appropriate.

Figure 7:
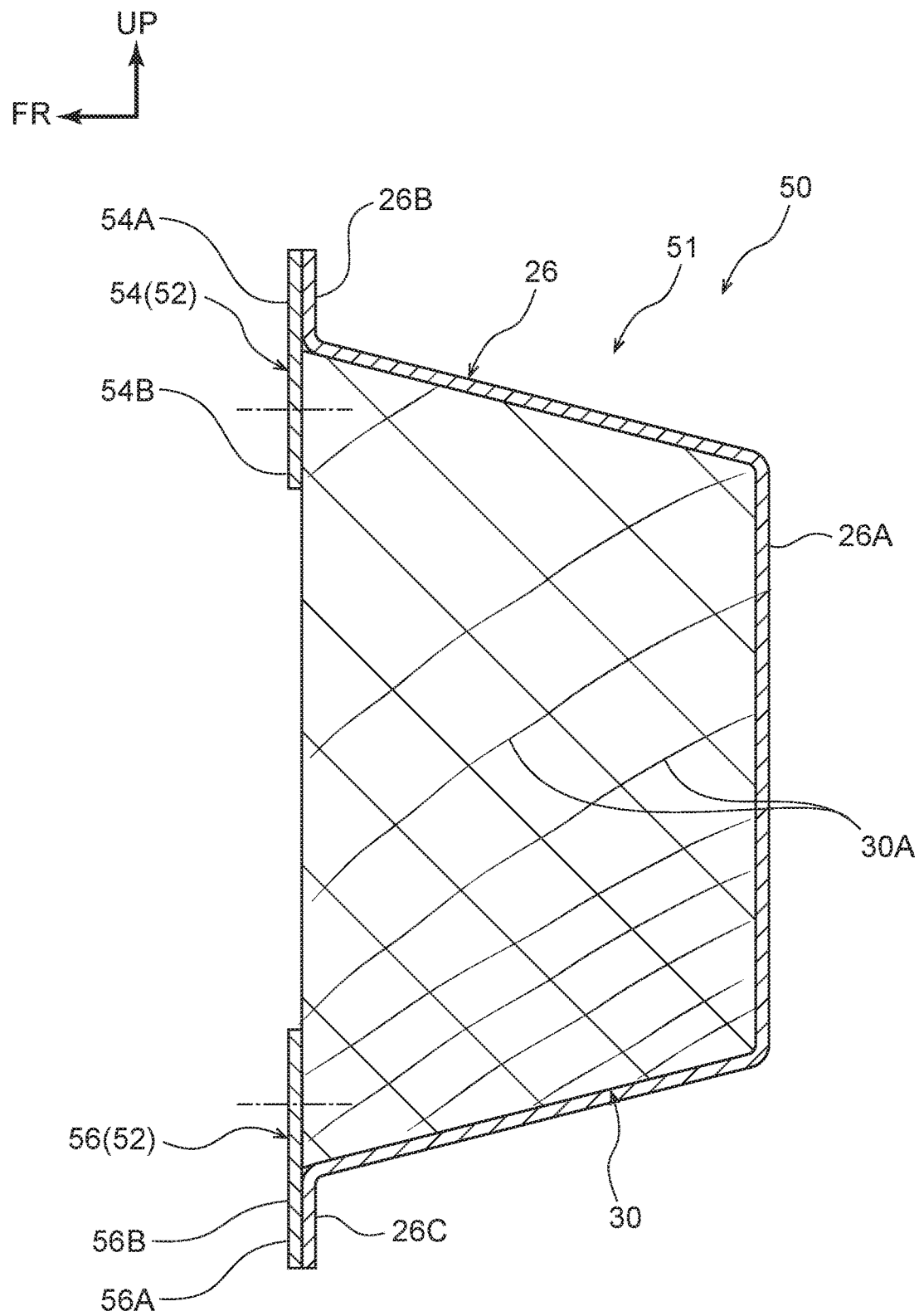
FIG. 7 is a schematic plan view that is partially broken and that schematically shows the front portion of a vehicle to which a bumper reinforcement relating to a second exemplary embodiment is mounted.

As shown in FIG. 7, in the same way as in the first exemplary embodiment, the bumper reinforcement 60 of the present exemplary embodiment has the bumper main body portion 24. Further, a reinforcing member 62 that is formed of wood and is block-shaped is disposed within the cross-section of the bumper main body portion 24. In the present exemplary embodiment, as an example, the reinforcing member 62 is formed of laminated wood.

Here, at the reinforcing member 62 of the present exemplary embodiment, the length in the vehicle transverse direction is formed to be shorter than that of the reinforcing member 30 of the first exemplary embodiment, and the reinforcing member 62 is disposed only within the cross-section of the vehicle transverse direction central portion of the bumper main body portion 24. Further, an end portion 62A at the vehicle right side of the reinforcing member 62 is positioned further toward the vehicle transverse direction inner side than the front end portion 14A of the front side member 14 that is at the right side, and further toward the vehicle right side (the vehicle transverse direction outer side) than the vehicle right side end portion of the power unit 18.

An end portion 62B at the vehicle left side of the reinforcing member 62 is positioned further toward the vehicle transverse direction inner side than the front end portion 14A of the front side member 14 that is at the left side, and further toward the vehicle left side (the vehicle transverse direction outer side) than the vehicle left side end portion of the power unit 18. Namely, the vehicle transverse direction both end portions of the reinforcing member 62 are positioned further toward the vehicle transverse direction inner side than the front end portions 14A of the front side members 14, and further toward the vehicle transverse direction outer sides than the power unit 18.

Further, the axially central direction of annual growth rings 62C of the wood that forms the reinforcing member 62 is a direction that runs along the vehicle transverse direction. Namely, when viewed in a plan cross-section, the annual growth rings 62C extend along the vehicle transverse direction.

(Operation)

Operation of the present exemplary embodiment are described next.

Figure 8:
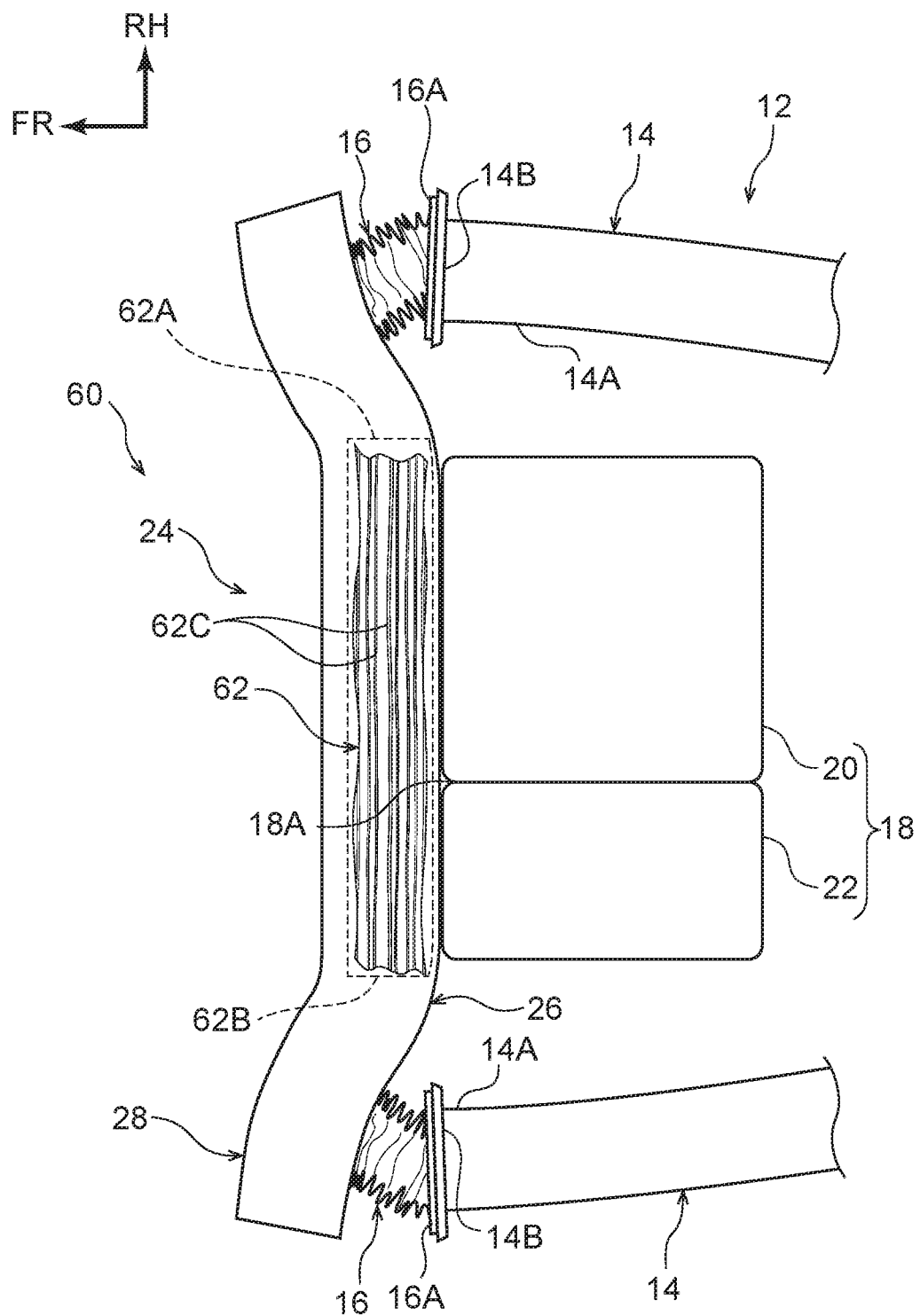
FIG. 8 is a schematic plan view that schematically shows a state in which the vehicle, to which the bumper reinforcement relating to the second exemplary embodiment is mounted, has front-collided with a pole.

At the bumper reinforcement 60 of the present exemplary embodiment, as shown in FIG. 8, when the pole P collides with the bumper reinforcement 60, two-point bending is brought about with the vehicle transverse direction both end portions of the reinforcing member 62 (the end portion 62A at the vehicle right side and the end portion 62B at the vehicle left side) being the starting points. Here, because the vehicle transverse direction both end portions of the reinforcing member 62 are positioned further toward the vehicle transverse direction inner side than the front end portions 14A of the front side members 14, the bumper reinforcement 60 may be bent at two points, further toward the vehicle transverse direction inner side than the front end portions 14A.

Further, because the vehicle transverse direction both end portions of the reinforcing member 62 are positioned further toward the vehicle transverse direction outer sides than the power unit 18, even in a case in which the reinforcing member 62 that has been bent at two points is displaced toward the power unit side, collision load being applied locally to the power unit 18 may be suppressed. As a result, the connected portion 18A of the engine 20 and the transaxle 22 breaking and the connected state being disconnected may be suppressed. Other operations are similar to those of the first exemplary embodiment.

Third Exemplary Embodiment

A bumper reinforcement 70 relating to a third exemplary embodiment is described next with reference to the drawings. Note that structures that are similar to those of the first exemplary embodiment are denoted by the same reference numerals, and description thereof is omitted as appropriate.

Figure 9:
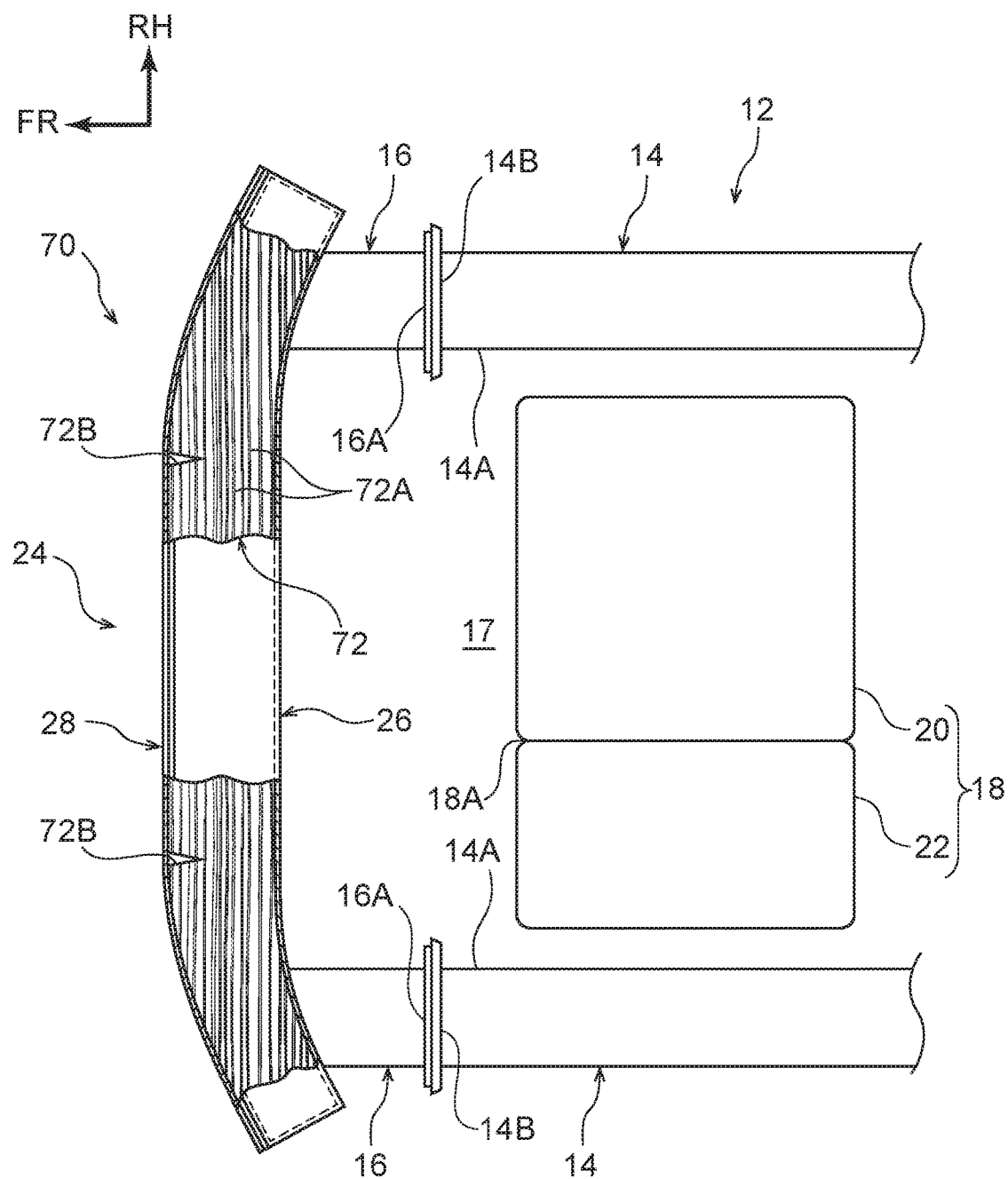
FIG. 9 is a schematic plan view that is partially broken and that schematically shows the front portion of a vehicle to which a bumper reinforcement relating to a third exemplary embodiment is mounted.

As shown in FIG. 9, in the same way as in the first exemplary embodiment, the bumper reinforcement 70 of the present exemplary embodiment has the bumper main body portion 24. A reinforcing member 72 that is formed of wood and is block-shaped is disposed within the cross-section of the bumper main body portion 24. In the present exemplary embodiment, as an example, the reinforcing member 72 is formed of laminated wood.

The reinforcing member 72 of the present exemplary embodiment is provided over the entire region from a vehicle transverse direction one end portion to the other end portion of the bumper main body portion 24. Therefore, the vehicle transverse direction outer side end portions of the reinforcing member 72 are positioned further toward the vehicle transverse direction outer sides than the front end portions 14A (the distal end portions) of the front side members 14. Further, the axially central direction of annual growth rings 72A of the wood that forms the reinforcing member 72 is a direction that runs along the vehicle transverse direction. Namely, as seen in a plan cross-section, the annual growth rings 72A extend along the vehicle transverse direction.

Here, notch portions 72B that serve as breakage starting point portions are formed at the reinforcing member 72 of the present exemplary embodiment. The notch portions 72B are provided as a left-right pair at the reinforcing member 72, further toward the vehicle transverse direction inner side than the front end portions 14A of the front side members 14. Each of the notch portions 72B is formed by the front surface of the reinforcing member 72 being cut-in in a substantial V-shape. Therefore, the notch portions 72B break more easily than the other regions of the reinforcing member 72.

(Operation)

Operation of the present exemplary embodiment are described next.

In the bumper reinforcement 70 of the present exemplary embodiment, in a case in which a collision body such as a pole or the like collides with the bumper reinforcement 70, the reinforcing member 72 breaks with the notch portions 72B being the starting points. As a result, two-point breakage is brought about at the bumper reinforcement 70. Here, because the vehicle transverse direction both end portions of the reinforcing member 72 are positioned further toward the vehicle transverse direction inner side than the front end portions 14A of the front side members 14, the bumper reinforcement 70 may be broken at two points, further toward the vehicle transverse direction inner side than the front end portions 14A. Other operations are similar to those of the first exemplary embodiment.

Note that, although the notch portions 72B of the present exemplary embodiment are positioned further toward the vehicle transverse direction inner side than the power unit 18, they are not limited to this, and the notch portions 72B may be formed further toward the vehicle transverse direction outer sides than the power unit 18. Further, a breakage starting point portion other than the notch portion 72B may be employed. For example, breakage starting point portions may be formed by making some regions of the reinforcing member be thin-walled.

Fourth Exemplary Embodiment

A bumper reinforcement 80 relating to a fourth exemplary embodiment is described next with reference to the drawings. Note that structures that are similar to those of the first exemplary embodiment are denoted by the same reference numerals, and description thereof is omitted as appropriate.

Figure 10:
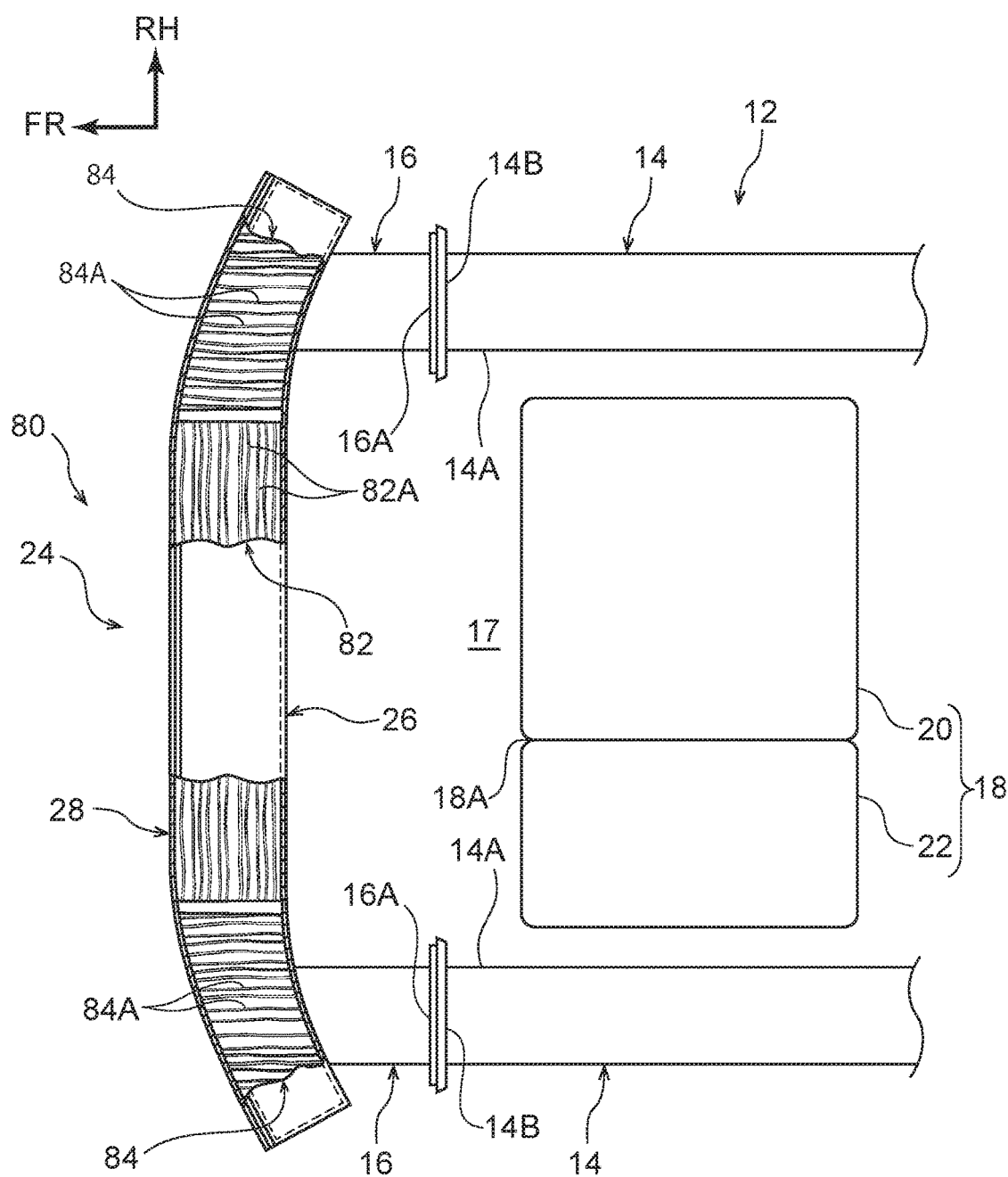
FIG. 10 is a schematic plan view that is partially broken and that schematically shows the front portion of a vehicle to which a bumper reinforcement relating to a fourth exemplary embodiment is mounted.

As shown in FIG. 10, in the same way as in the first exemplary embodiment, the bumper reinforcement 80 of the present exemplary embodiment has the bumper main body portion 24. A reinforcing member 82 that is formed of wood and is block-shaped is disposed within the cross-section of the bumper main body portion 24. In the present exemplary embodiment, as an example, the reinforcing member 82 is formed of laminated wood.

The length in the vehicle transverse direction of the reinforcing member 82 of the present exemplary embodiment is formed to be shorter than that of the reinforcing member 30 of the first exemplary embodiment. The reinforcing member 82 is disposed only within the cross-section of the vehicle transverse direction central portion of the bumper main body portion 24. Further, the vehicle transverse direction both end portions of the reinforcing member 82 are positioned further toward the vehicle transverse direction inner side than the front end portions 14A of the front side members 14.

The axially central direction of annual growth rings 82A of the wood that forms the reinforcing member 82 is a direction that runs along the vehicle transverse direction. Namely, as seen in a plan cross-section, the annual growth rings 82A extend along the vehicle transverse direction.

Here, in the present exemplary embodiment, side reinforcing members 84 are provided at the vehicle transverse direction both sides of the reinforcing member 82. The side reinforcing members 84 are formed of wood (laminated wood) and are block-shaped, and are disposed within the cross-sections of the vehicle transverse direction both end portions of the bumper main body portion 24. Therefore, the side reinforcing members 84 are positioned at the vehicle front sides (the vehicle longitudinal direction outer sides) of the front end portions 14A of the front side members 14.

Further, in the present exemplary embodiment, the reinforcing member 82 and the side reinforcing members 84 are formed integrally of laminated wood. The axially central direction of annual growth rings 84A of the wood that forms the side reinforcing members 84 is a direction that runs along the vehicle longitudinal direction. Namely, as seen in a plan cross-section, the annual growth rings 84A are formed along the vehicle longitudinal direction.

(Operation)

Operation of the present exemplary embodiment are described next.

In the bumper reinforcement 80 of the present exemplary embodiment, the axially central direction of the annual growth rings 82A of the reinforcing member 82 is a direction that runs along the vehicle transverse direction. Therefore, in a case in which a collision body such as a pole or the like collides with the vehicle transverse direction central portion of the bumper reinforcement 80, the collision load is dispersed in the vehicle transverse direction, and local breakage of the bumper reinforcement 80 may be suppressed.

Further, the axially central direction of the annual growth rings 84A of the side reinforcing members 84 is a direction that runs along the vehicle longitudinal direction. Therefore, in a case in which collision load is inputted to the side reinforcing members 84, the side reinforcing members 84 are crushed in the vehicle longitudinal direction, and may absorb collision energy. In particular, in a structure in which the side reinforcing members 84 are provided at the vehicle front sides of the crush boxes 16 as in the present exemplary embodiment, collision energy may be effectively absorbed by the side reinforcing members 84 and the crush boxes 16.

Fifth Exemplary Embodiment

A bumper reinforcement 90 relating to a fifth exemplary embodiment is described next with reference to the drawings. Note that structures that are similar to those of the first exemplary embodiment are denoted by the same reference numerals, and description thereof is omitted as appropriate.

Figure 11:
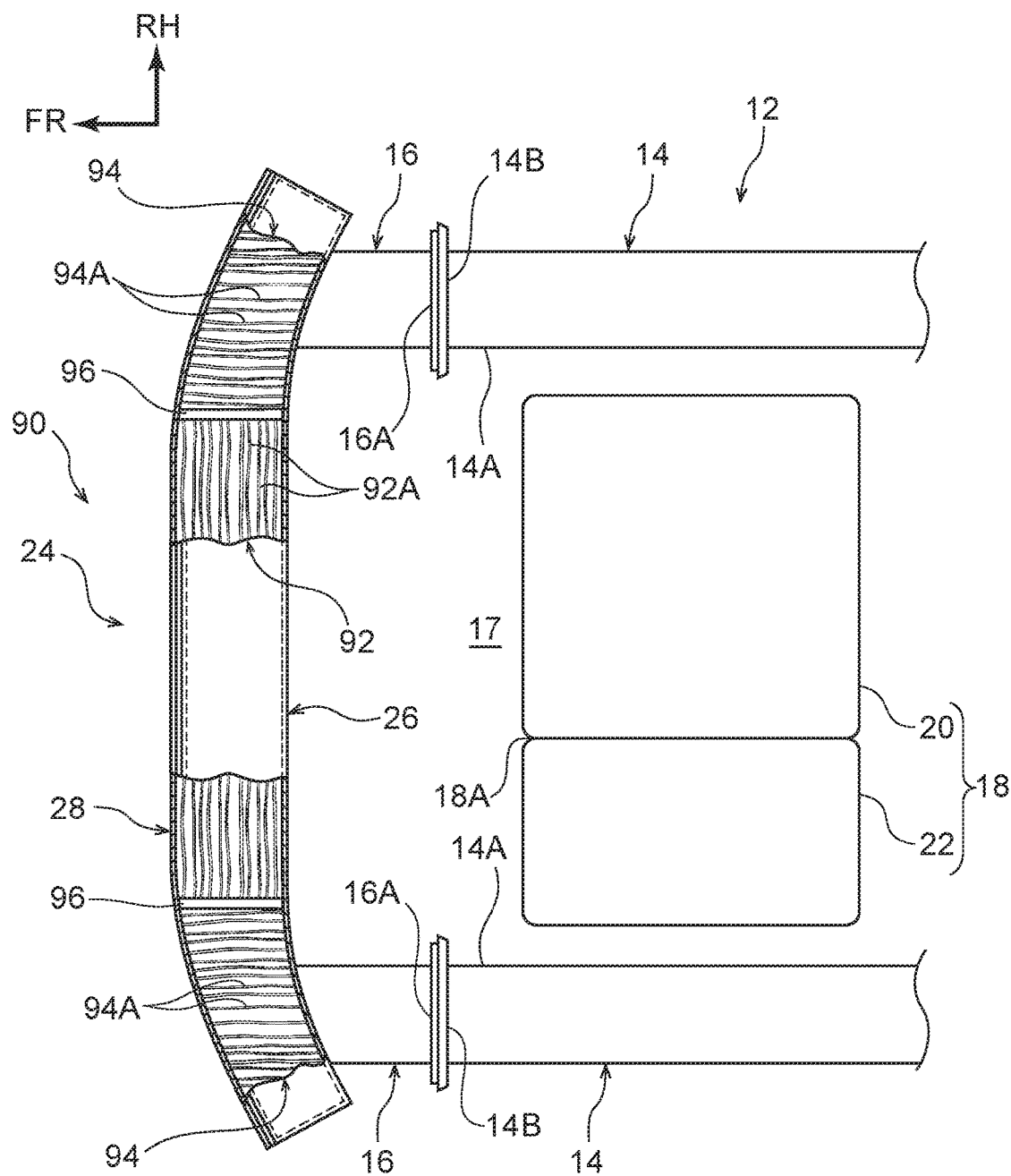
FIG. 11 is a schematic plan view that is partially broken and that schematically shows the front portion of a vehicle to which a bumper reinforcement relating to a fifth exemplary embodiment is mounted.

As shown in FIG. 11, in the same way as in the first exemplary embodiment, the bumper reinforcement 90 of the present exemplary embodiment has the bumper main body portion 24. A reinforcing member 92 that is formed of wood and is block-shaped is disposed within the cross-section of the bumper main body portion 24.

The length in the vehicle transverse direction of the reinforcing member 92 of the present exemplary embodiment is formed to be shorter than that of the reinforcing member 30 of the first exemplary embodiment. The reinforcing member 92 is disposed only within the cross-section of the vehicle transverse direction central portion of the bumper main body portion 24. Further, the vehicle transverse direction both end portions of the reinforcing member 92 are positioned further toward the vehicle transverse direction inner side than the front end portions 14A of the front side members 14.

The axially central direction of annual growth rings 92A of the wood that forms the reinforcing member 92 is a direction that runs along the vehicle transverse direction. Namely, as seen in a plan cross-section, the annual growth rings 92A extend along the vehicle transverse direction.

Here, in the present exemplary embodiment, side reinforcing members 94 are provided at the vehicle transverse direction both sides of the reinforcing member 92. The side reinforcing members 94 are formed of wood and are block-shaped, and are disposed within the cross-sections of the vehicle transverse direction both end portions of the bumper main body portion 24. Therefore, the side reinforcing members 94 are positioned at the vehicle front sides (the vehicle longitudinal direction outer sides) of the front end portions 14A of the front side members 14.

Further, in the present exemplary embodiment, gaps are formed between the side reinforcing members 94 and the reinforcing member 92. Namely, the reinforcing member 92 and the side reinforcing members 94 are disposed with gaps therebetween. Moreover, the axially central direction of annual growth rings 94A of the wood that forms the side reinforcing members 94 is a direction that runs along the vehicle longitudinal direction. Namely, as seen in a plan cross-section, the annual growth rings 94A are formed along the vehicle longitudinal direction.

(Operation)

Operation of the present exemplary embodiment are described next.

In the bumper reinforcement 90 of the present exemplary embodiment, the axially central direction of the annual growth rings 92A of the reinforcing member 92 is a direction that runs along the vehicle transverse direction. Therefore, in a case in which a collision body such as a pole or the like collides with the vehicle transverse direction central portion of the bumper reinforcement 90, the collision load is dispersed in the vehicle transverse direction, and local breakage of the bumper reinforcement 90 may be suppressed.

Further, the axially central direction of the annual growth rings 94A of the side reinforcing members 94 is a direction that runs along the vehicle longitudinal direction. Therefore, in a case in which collision load is inputted to the side reinforcing members 94, the side reinforcing members 94 are crushed in the vehicle longitudinal direction, and may absorb collision energy. In particular, in a structure in which the side reinforcing members 94 are provided at the vehicle front sides of the crush boxes 16 as in the present exemplary embodiment, collision energy may be effectively absorbed by the side reinforcing members 94 and the crush boxes 16.

Moreover, in the present exemplary embodiment, in a case in which a collision body collides with the bumper reinforcement 90, two-point breakage of the bumper reinforcement 90 is brought about with gaps 96, which are between the reinforcing member 92 and the side reinforcing members 94, being the starting points. Due thereto, local breakage of the bumper reinforcement 90 at the vehicle transverse direction central portion thereof may be suppressed while collision energy is effectively absorbed.

Although bumper reinforcements relating to exemplary embodiments have been described above, the present disclosure can, of course, be embodied in various forms within a scope that does not depart from the gist thereof. For example, although the reinforcing member is block-shaped and is formed of laminated wood in the above-described exemplary embodiments, the present disclosure is not limited to this, and the reinforcing member may be formed of solid wood.

Further, the above exemplary embodiments describe bumper reinforcements that are disposed at the vehicle front portion. However, the present disclosure is not limited to this, and may be applied to a bumper reinforcement that is disposed at the vehicle rear portion. In this case, the bumper main body portion is provided at the vehicle rear side (the vehicle longitudinal direction outer side) of a pair of left and right rear side members that are disposed at the vehicle rear portion and extend in the vehicle longitudinal direction. Further, the reinforcing member that is formed of wood and is block-shaped is disposed within the cross-section of this bumper main body portion, and the axially central direction of the annual growth rings of the reinforcing member is a direction that runs along the vehicle transverse direction. In this case as well, in the same way as in the above-described exemplary embodiments, local breakage of the bumper reinforcement may be suppressed due to collision load being dispersed in the vehicle transverse direction that is the axially central direction of the annual growth rings.

Moreover, in the above-described exemplary embodiments, the crash boxes 16 are provided at the vehicle front side of the front side members 14. However, the present disclosure is not limited to this, and may be a structure that does not have the crash boxes 16. In this case, the front end portions 14A of the front side members 14 are connected to the bumper main body portion. Here, in the case of using the bumper reinforcement 80 of the fourth exemplary embodiment that is shown in FIG. 10 or the bumper reinforcement 90 of the fifth exemplary embodiment that is shown in FIG.

11, operations that are similar to those of the crash boxes 16 may be anticipated because the side reinforcing members are crushed in the vehicle longitudinal direction and some of the collision energy is absorbed.

What is claimed is:

1. A bumper reinforcement comprising:
    a bumper main body portion extending in a vehicle transverse direction and is provided at a vehicle longitudinal direction outer side of a pair of left and right side members, the pair of left and right side members being disposed at a vehicle front portion or a vehicle rear portion and extending in a vehicle longitudinal direction; and
    a reinforcing member formed of wood and is block-shaped, and that is disposed within a cross-section of at least a vehicle transverse direction central portion of the bumper main body portion, an axially central direction of annual growth rings of the wood of the reinforcing member being set to a direction that runs along the vehicle transverse direction.

2. The bumper reinforcement of claim 1, wherein:
    a power unit, at which an engine and a transaxle are connected in the vehicle transverse direction, is disposed at a vehicle longitudinal direction inner side of the vehicle transverse direction central portion of the bumper main body portion; and
    the reinforcing member is disposed at a vehicle longitudinal direction outer side of at least a connected portion of the engine and the transaxle.

3. The bumper reinforcement of claim 1, wherein both end portions in the vehicle transverse direction of the reinforcing member are positioned further toward vehicle transverse direction outer sides than distal end portions of the side members.

4. The bumper reinforcement of claim 3, wherein the reinforcing member includes a pair of left and right breakage starting point portions that are provided further toward a vehicle transverse direction inner side than the distal end portions of the side members.

5. The bumper reinforcement of claim 2, wherein both end portions in the vehicle transverse direction of the reinforcing member are positioned further toward a vehicle transverse direction inner side than distal end portions of the side members and further toward vehicle transverse direction outer sides than the power unit.

6. The bumper reinforcement of claim 1, further comprising side reinforcing members provided at both end portions in the vehicle transverse direction of the reinforcing member, which are positioned at vehicle longitudinal direction outer sides of distal end portions of the side members, the side reinforcing members being formed of wood and being block-shaped, an axially central direction of annual growth rings of the wood of the side reinforcing members being set to a direction that runs along the vehicle longitudinal direction.

7. The bumper reinforcement of claim 6, wherein gaps are provided between the side reinforcing members and the reinforcing member.

* * * * *